United States Patent Office 3,518,295
Patented June 30, 1970

3,518,295
PROCESS FOR PREPARING UNSATURATED NITRILES BY CATALYTIC AMMOXIDATION OF OLEFINS
Jamal S. Eden, Akron, Ohio, assignor to The B. F. Goodrich Company, New York, N.Y., a corporation of New York
No Drawing. Filed May 2, 1968, Ser. No. 726,214
Int. Cl. C07c 121/02
U.S. Cl. 260—465.3     5 Claims

ABSTRACT OF THE DISCLOSURE

Unsaturated nitriles such as acrylonitrile and methacrylonitrile are prepared in excellent yields by the ammoxidation of propylene or isobutylene in the presence of a catalyst containing chromium molybdate, tellurium oxide and phosphorus oxide.

BACKGROUND OF THE INVENTION

Nitriles have been prepared by catalytic ammoxidation of hydrocarbons, especially from the normally gaseous hydrocarbons. Prior catalysts and procedures for ammoxidizing propylene or isobutylene to acrylonitrile or methacrylonitrile have certain shortcomings. Improved catalysts and processes providing increased amounts of acrylonitrile, for example, at faster rates are desired.

SUMMARY OF THE INVENTION

Acrylonitrile or methacrylonitrile are obtained in improved yields at short contact times when propylene or isobutylene are ammoxidized at an elevated temperature with ammonia and an oxygen-containing gas in the presence of catalysts initially containing chromium molybdate, tellurium oxide and phosphorus oxide in a molar ratio of 1–10 chromium molybdate, 1–10 tellurium oxide and 1–10 phosphorus pentoxide. Such catalysts will convert from over 50, as 90% or more, per pass, of propylene or isobutylene at improved yields of acrylonitrile or methacrylonitrile.

DETAILED DESCRIPTION

The reactants

The essential reactants are propylene or isobutylene, ammonia and an oxygen-containing gas, which can be pure oxygen, oxygen enriched air or air without additional oxygen. For reasons of economy, air is the preferred oxygen-containing reactant.

The addition of steam into the reactor along with the monoolefin, ammonia and an oxygen-containing gas is desirable. Other diluent gases can be used as saturated hydrocarbons such as propane or butane which are rather inert under the reaction conditions, nitrogen, argon, krypton or other known inert gases can be used as diluents if desired.

The reactions may be conducted in either fixed bed or in fluid bed systems. The particle size of the catalyst for fixed bed operations normally is from about 10 to 18 mesh. Larger and smaller size particles may be used in fixed beds if desired. For fluid bed operations, the catalyst size normally will range from about 80 to 325 mesh (U.S. Sieve).

The active catalyst containing chromium molybdate, tellurium oxide and phosphorus oxide may be prepared by a number of methods and may be supported or unsupported. The catalyst ingredients may be mixed in the form of solutions or slurries, or can be dry blended. Supported catalysts may be prepared by adding a dry support or aqueous slurry thereof to the catalyst ingredients.

Among suitable supports are silica, silica-containing alumina, titanium oxide, materials such as diatomaceous earth, kieselguhr, silicon carbide, clay, aluminum oxides and the like.

An unsupported catalyst used in the examples herein was prepared by dissolving 132.45 grams of ammonium molybdate in 250 ml. of water. 90 grams of $NH_4OH$ was added and the mixture heated for 2 hours at 80° C. 133.24 grams of $CrCl_3 \cdot 6H_2O$ dissolved in 200 ml. of water was added to the ammonium molybdate solution. The resulting $Cr_2(MoO_4)_3$ was filtered, washed, reslurried in water and the slurry mixed with 72 grams of ammonium tellurate and 67.8 grams of 85% $H_3PO_4$. The resulting mixture was evaporated to dryness on a steam bath and calcined in a hot tube oven for 16 hours at 400 to 425° C. The catalyst was ground to a mesh size of 10 to 18 mesh (U.S. Sieve). This catalyst contains chromium molybdate, tellurium oxide and phosphorus pentoxide in a molar ratio of 1:1:1. Alternatively, powdered chromium molybdate and ammonium tellurate may be mixed with phosphoric acid, a dry support added thereto if desired, and the mixture dried.

A supported catalyst was prepared by mixing a water slurry containing 0.0625 mol of $Cr_2(MoO_4)_3$ prepared from ammonium molybdate ad chromium nitrate with 323 grams of finely divided low surface silica-alumina in 350 ml. of water. A slurry containing 19.7 grams of ammonium tellurate was added to this mixture and 14.4 grams of 85% phosphoric acid. The mix was dried and calcined at 400–425° for 16 hours, cooled and powdered to a mesh size of 80 to 325 for fluid bed operations. The catalyst contains 16% actives on the silica-alumina and has a molar ratio of 1:1:1 of $Cr_2(MoO_4)_3:TeO_2:P_2O_5$.

REACTION CONDITIONS

The reaction temperature can range from about 350 to 525° C. but the preferred range is from about 375 to about 480° C. Below about 375° C. the conversion of monoolefin per pass and yield of unsaturated nitrile is lower than desirable. Above 480° C. some of the acrylonitrile appears to be oxidized to carbon oxides, acetonitrile and HCN. This is much more apparent above 500° C.

The mol ratio of oxygen to propylene should be from 1.5 to 1, and preferably from 2 to 1 to 4 to 1 for good conversion and yields. Ratios with some excess oxygen, 33 to 100% is desirable and is preferred. There is no critical upper limit as to the mount of oxygen, but when air is used as the molecular oxygen-containing gas, too great an excess will require large reactors, pumps, compressors and other auxiliary equipment for any given amount of desired end product. It is therefore best to limit the amount of air to provide 33 to 66% excess of oxygen. This range provides the largest proportion of nitrile under given reaction conditions.

The mol ratio of ammonia to propylene can range from about 0.5 to 1 about 1.75 to 1. A preferred ratio is 0.75 to 1.5 mol of ammonia per mol of propylene.

The molar ratio of steam to propylene can range from 0 to about 10, but best results are obtained with molar ratios of about 3 to 5 per mol of propylene and for this reason are preferred.

The cold contact time can vary considerably in the range of about 1 to 70 seconds, calculated at room temperature and pressure, 25° C. and 760 mm. Good results are obtained in a range of about 8 to 54 seconds and this range is preferred.

The reaction can be run at atmospheric pressure, in a partial vacuum or under induced pressure up to 50–100 p.s.i. Atmospheric pressure is preferred for fixed bed systems and a pressure of 1 to 50 p.s.i. for fluid bed reactions. The pressure preferably is below the dew point pressure of the acrylonitrile or methacrylonitrile at the reaction temperature.

The examples are intended to illustrate the invention but not to limit it.

EXAMPLE 1

The catalyst in this example was prepared by the first procedures described above. It contained $Cr_2(MoO_4)_3$, $TeO_2$ and $P_2O_5$ in a molar ratio of 1:1:1 and was unsupported. A high silica glass (Vycor) tube 12 inches long and 30 mm. in outer diameter was filled with 170 ml. of the catalyst. Three external electrically operated heating coils are wound on the reactor. One of the coils extended along the entire length of the reactor and each of the remaining coils extended about one half the length of the reactor. Outlet vapors were passed through a short water cooled condenser. Uncondensed gases were passed through a gas chromatograph and analyzed continuously. The liquid condenser was weighed and then analyzed for its acrylonitrile content in the gas chromatograph.

Steam at a temperature of 200–250° C. was first passed into this fixed bed reactor. Then propylene, air and ammonia were fed separately into the stream of water vapor. The mixture passed through a preheater and entered the reactor at a temperature of 200–250° C. The reactor was preheated to about 300° C. before the gas feed was begun. The molar ratio of the feed was 3 mols of oxygen (supplied as air) per mol of propylene, 4 mols of water per mol of propylene and 1.07 mols of ammonia per mol of propylene. The temperature in the reactor was raised to 455° C. and held at this temperature. The cold contact time was 21 seconds. 98.41% of the propylene was converted in the reactor to produce a mol percent yield of 60.12% of acrylonitrile.

Example 2

The silica supported catalyst prepared as described above and having 16% actives on the support was utilized in a fluidized bed reactor. The reaction conditions employed were: a ratio of 4 mols of oxygen (air), 1.43 mols of ammonia and 4 mols of steam per mol of propylene, a temperature of 440° C. and a contact time of 28 seconds (25° C. and 760 mm.). 81.18% of the propylene was converted, the mol percent yield of acrylonitrile was 81.20 at 440° C. and contact time of 22 seconds, a conversion of 90.67% and a yield of 72.57% acrylonitrile was obtained.

Example 3

Using another catalyst of the same type of Example 2 with 24% catalyst materials deposited on the silica-alumina, at 450° C., 21 seconds, 1.04 mols of ammonium, 3 mols of oxygen and 4 mols of steam per mol of propylene, a conversion of 91.39% and yield of acrylonitrile of 65.42% was obtained at a contact time of 21 seconds.

When the above examples are repeated with isobutylene, excellent conversions to methacrylonitrile is obtained.

I claim:
1. A method for ammoxidizing olefins to form unsaturated nitriles which comprises passing propylene or isobutylene, a molecular oxygen-containing gas in a quantity sufficient to provide a molar ratio of from about 1.5 to 4 mols of oxygen per mol of olefin, ammonia in a molar ratio of from about 0.5 to 1.75 mols of ammonia per mol of olefin, over a catalyst consisting essentially of chromium molybdate, tellurium oxide and phosphorus oxide in a molar ratio of 1–10 chromium molybdate, 1–10 tellurium oxide and 1–10 phosphorus pentoxide, at a temperature of about 350° C. to 525° C.

2. The method of claim 1 wherein the hydrocarbon is propylene, oxygen is present in amount from about 2 to 4 mols per mol of propylene, ammonia from about 1 to about 1.5 mols per mol of propylene, and there is present from 0 to about 10 mols of water vapor per mol of propylene and the reaction temperature is from about 375° C. to 475° C.

3. The method of claim 1 in which the hydrocarbon is isobutylene, oxygen is present in amount from about 2 to 4 mols per mol of isobutylene, ammonia from about 1 to about 1.5 mols per mol of isobutylene, and there is present from 0 to about 10 mols of water vapor per vol of isobutylene and the reaction temperature is from about 375° C. to 475° C.

4. The method of claim 2 wherein the molar ratio is 1:1–2:1–2.

5. The method of claim 3 wherein the molar ratio is 1:1–2:1–2.

References Cited

UNITED STATES PATENTS 3,253,014   5/1966   McDaniel et al. ____ 260—465.3

JOSEPH P. BRUST, Primary Examiner

U.S. Cl. X.R.

252—435